US012584622B1

(12) United States Patent
Li

(10) Patent No.: US 12,584,622 B1
(45) Date of Patent: Mar. 24, 2026

(54) POWER STRIP WITH FOLDABLE LAMP

(71) Applicant: TONGHUA INTELLIGENT TECHNOLOGY CO., LTD

(72) Inventor: Zhijin Li, Dongguan (CN)

(73) Assignee: TONGHUA INTELLIGENT TECHNOLOGY CO., LTD, Dongguan (CN)

( * ) Notice: Subject to any disclaimer, the term of this patent is extended or adjusted under 35 U.S.C. 154(b) by 0 days.

(21) Appl. No.: 19/080,191

(22) Filed: Mar. 14, 2025

(30) Foreign Application Priority Data

Feb. 11, 2025 (CN) ......................... 202510151027.9

(51) Int. Cl.

| | |
|---|---|
| ***F21V 33/00*** | (2006.01) |
| ***F21V 21/26*** | (2006.01) |
| ***F21V 21/28*** | (2006.01) |
| ***F21V 23/04*** | (2006.01) |
| ***H01R 13/717*** | (2006.01) |

(52) U.S. Cl.

CPC .......... *F21V 33/0004* (2013.01); *F21V 21/26* (2013.01); *F21V 21/28* (2013.01); *F21V 23/04* (2013.01); *H01R 13/717* (2013.01)

(58) Field of Classification Search

CPC ...... F21V 33/0004; F21V 21/26; F21V 23/04; F21V 21/28; F21V 21/29; H04R 13/717

USPC ........................................ 362/410, 419, 427

See application file for complete search history.

(56) References Cited

U.S. PATENT DOCUMENTS

| | | | | |
|---|---|---|---|---|
| 10,601,973 | B1 * | 3/2020 | Raghunathan | H01R 27/00 |
| 10,998,736 | B2 * | 5/2021 | Chien | H02G 3/14 |
| 2007/0097689 | A1 * | 5/2007 | Barausky | F21V 33/0052 362/410 |
| 2013/0329431 | A1 * | 12/2013 | Lin | F21S 6/003 362/253 |

* cited by examiner

*Primary Examiner* — Laura K Tso

(74) *Attorney, Agent, or Firm* — HOWARD M COHN and Associates, LLC

(57) ABSTRACT

A power strip with a foldable lamp related to a technical field of household appliances is provided, including a power strip base, a foldable arm, and a light source module. The power strip base includes an outer housing, a plug-in module, and a power cord, the plug-in module is disposed in the outer housing, socket openings are disposed on the outer housing and are aligned with the plug-in module, the power cord is disposed at a first side of the outer housing and is configured to electrically connected to the plug-in module. A connecting component is disposed at a second side of the outer housing, and the connecting component is configured to connect to the foldable arm. The foldable arm includes a foldable supporting frame and a rotating disc.

10 Claims, 13 Drawing Sheets

POWER STRIP WITH FOLDABLE LAMP

TECHNICAL FIELD

The present disclosure relates to a technical field of household appliances, and in particular to a power strip with a foldable lamp.

BACKGROUND

Power strips have become indispensable electronic devices in daily life, with advancements occurring at a rapid pace. In today's evolving context, design and manufacturing processes of the power strips continue to be refined and enhanced. Innovations, such as advanced safety protections, improved efficiency, and more attractive appearance designs, ensure that power strips not only fulfill essential daily needs but also strive toward superior quality and performance.

Current power strips are typically single in function, resulting in practical shortcomings during use. Therefore, it is necessary to improve a design of the current power strips according to actual usage environment.

SUMMARY

In order to solve aforementioned problems, the present disclosure provides a power strip with a foldable lamp, which not only fulfills basic user needs for power strips and lighting but also enhances comfort and practicality through innovative design.

Technical solutions adopted by the present disclosure are as follows.

The present disclosure provides the power strip with the foldable lamp, including a power strip base, a foldable arm, and a light source module. The power strip base includes an outer housing, a plug-in module, and a power cord, the plug-in module is disposed in the outer housing, socket openings are disposed on the outer housing and are aligned with the plug-in module, the power cord is disposed at a first side of the outer housing and is configured to electrically connect to the plug-in module. A connecting component is disposed at a second side of the outer housing, and the connecting component is configured to connect to the foldable arm. The foldable arm includes a foldable supporting frame and a rotating disc, a first end of the foldable supporting frame is hinged to the connecting component, and a second end of the foldable supporting frame is hinged to the rotating disc. The light source module includes a lamp frame and a light-emitting module, the light-emitting module is disposed on the lamp frame, a rotating connection groove is disposed at one side of the lamp frame, and the rotating disc is disposed on the rotating connection groove.

Beneficial effects of the present disclosure are as follows.

Compared with power strips in the prior art, the present disclosure provides a versatile and space-efficient solution by ingeniously combining the power strip base, the foldable arm, and the light source module. The power strip base forms a foundation of the power strip with the foldable lamp provided by the present disclosure, providing both stability and reliability, and the outer housing not only protects the plug-in module disposed therein but also enhances safety during use. Meanwhile, the connecting component disposed at the first side of the outer housing provides convenience for connection of the foldable arm, ensuring that the power strip with the foldable lamp remains compact while offering great flexibility. The foldable arm is a standout of the present disclosure. By hinging the foldable supporting frame to the rotating disc, the users may adjust a height and an angle of the foldable lamp as required, so as to accommodate various lighting requirements in different settings. This foldable design not only saves space but also boosts portability of the power strip with the foldable lamp, which is easy for the users to carry and use in different environments. As for the light source module, the light-emitting module is disposed on the lamp frame, which ensures stability and uniformity of lighting. The rotating connection groove disposed at the one side of the lamp frame allows the rotating disc to firmly mount on the lamp frame, thereby achieving a reliable connection between the light source module and the foldable arm. Such design not only improves flexibility of lighting but also ensures stability and durability of the power strip with the foldable lamp during use. The present disclosure demonstrates significant technical advantages in terms of structural design, functional integration, and user convenience, which not only fulfills the basic user needs for the power strips and lighting but also significantly improves the comfort and the practicality through the innovative design.

DETAILED DESCRIPTION OF EMBODIMENTS

Figure 1:
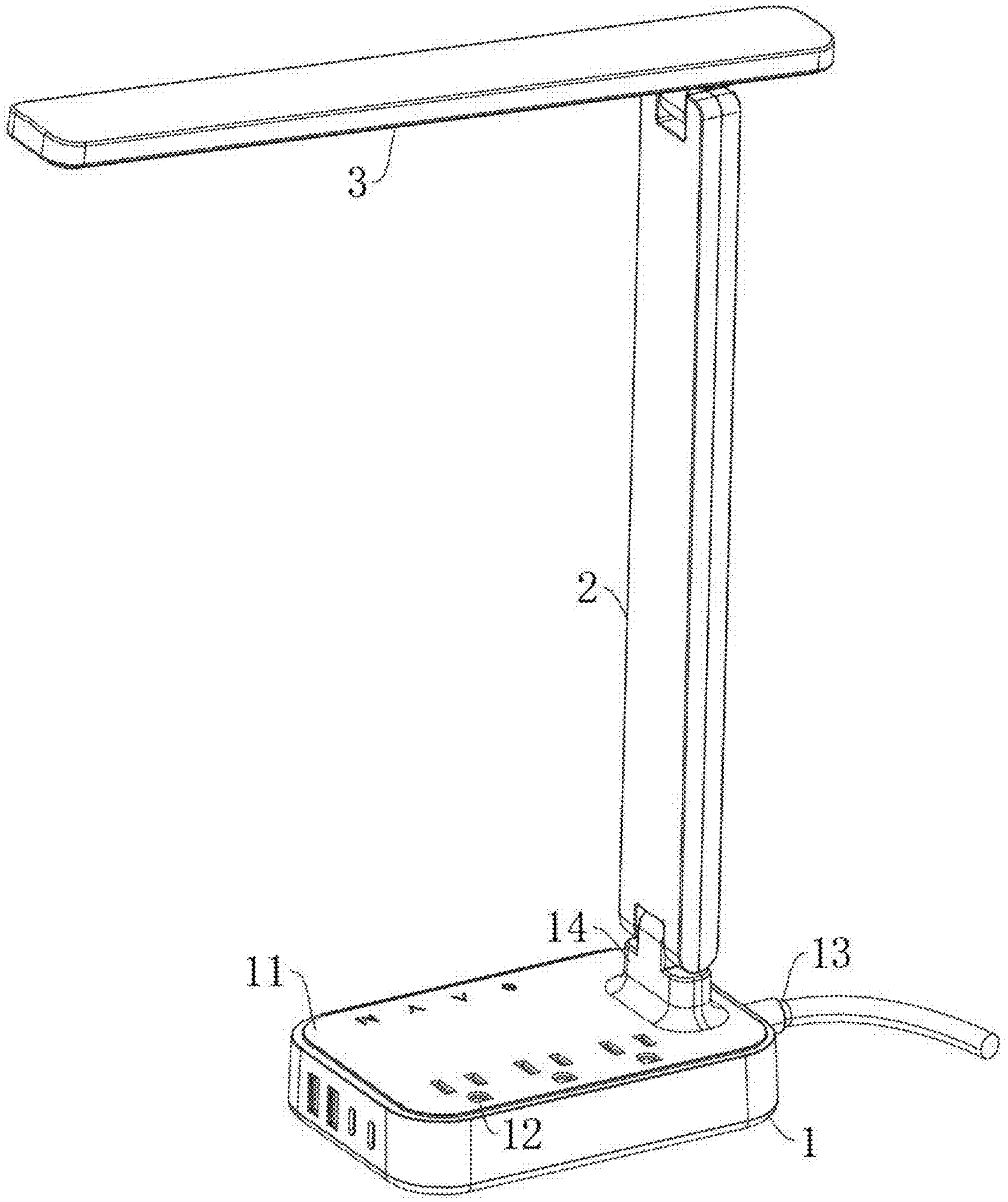
FIG. 1 is a three-dimensional schematic diagram of a power strip with a foldable lamp according to one embodiment of the present disclosure.

In order to facilitate understanding of the present disclosure, the present disclosure is described more fully hereinafter with reference to accompanying drawings. Preferred embodiments of the present disclosure are shown in the accompanying drawings. However, the present disclosure may be implemented in many different forms and is not limited to the embodiments described herein. On the contrary, a purpose of providing these embodiments is to make the understanding of the present disclosure more thorough and comprehensive.

As shown in FIGS. 1-14, in one embodiment, the present disclosure provides a power strip with the foldable lamp, including a power strip base 1, a foldable arm 2, and a light source module 3. The power strip base 1 includes an outer housing 11, a plug-in module 12, and a power cord 13, the plug-in module 12 is disposed in the outer housing 11, socket openings 111 are disposed on the outer housing 11 and are aligned with the plug-in module 12, the power cord 13 is disposed at a first side of the outer housing 11 and is configured to electrically connected to the plug-in module 12. A connecting component 14 is disposed at a second side of the outer housing 11, and the connecting component 14 is configured to connect to the foldable arm 2. The foldable arm 2 includes a foldable supporting frame 21 and a rotating disc 22, a first end of the foldable supporting frame 21 is hinged to the connecting component 14, and a second end of the foldable supporting frame 21 is hinged to the rotating disc 22. The light source module 3 includes a lamp frame 31 and a light-emitting module 32, the light-emitting module 32 is disposed on the lamp frame 31, a rotating connection groove 33 is disposed at one side of the lamp frame 31, and the rotating disc 22 is disposed on the rotating connection groove 33. The present disclosure provides a versatile and space-efficient solution by ingeniously combining the power strip base 1, the foldable arm 2, and the light source module 3. The power strip base 1 forms a foundation of the power strip with the foldable lamp provided by the present disclosure, providing both stability and reliability, and the outer housing 11 not only protects the plug-in module 12 disposed therein but also enhances safety during use. Meanwhile, the connecting component 14 disposed at the first side of the outer housing 11 provides convenience for connection of the foldable arm 2, ensuring that the power strip with the foldable lamp remains compact while offering great flexibility. The foldable arm 2 is a standout of the present disclosure. By hinging the foldable supporting frame 21 to the rotating disc 22, the users may adjust a height and an angle of the foldable lamp as required, so as to accommodate various lighting requirements in different settings. This foldable design not only saves space but also boosts portability of the power strip with the foldable lamp, which is easy for the users to carry and use in different environments. Regarding the light source module 3, the light-emitting module 32 is disposed on the lamp frame 31, which ensures stability and uniformity of lighting. The rotating connection groove 33 disposed at the one side of the lamp frame 31 allows the rotating disc 22 to firmly mount on the lamp frame 31, thereby achieving a reliable connection between the light source module 3 and the foldable arm 2. Such design not only improves flexibility of lighting but also ensures stability and durability of the power strip with the foldable lamp during use. The present disclosure demonstrates significant technical advantages in terms of structural design, functional integration, and user convenience, which not only fulfills the basic user needs for the power strips and lighting but also significantly improves the comfort and the practicality through the innovative design.

Figure 5:
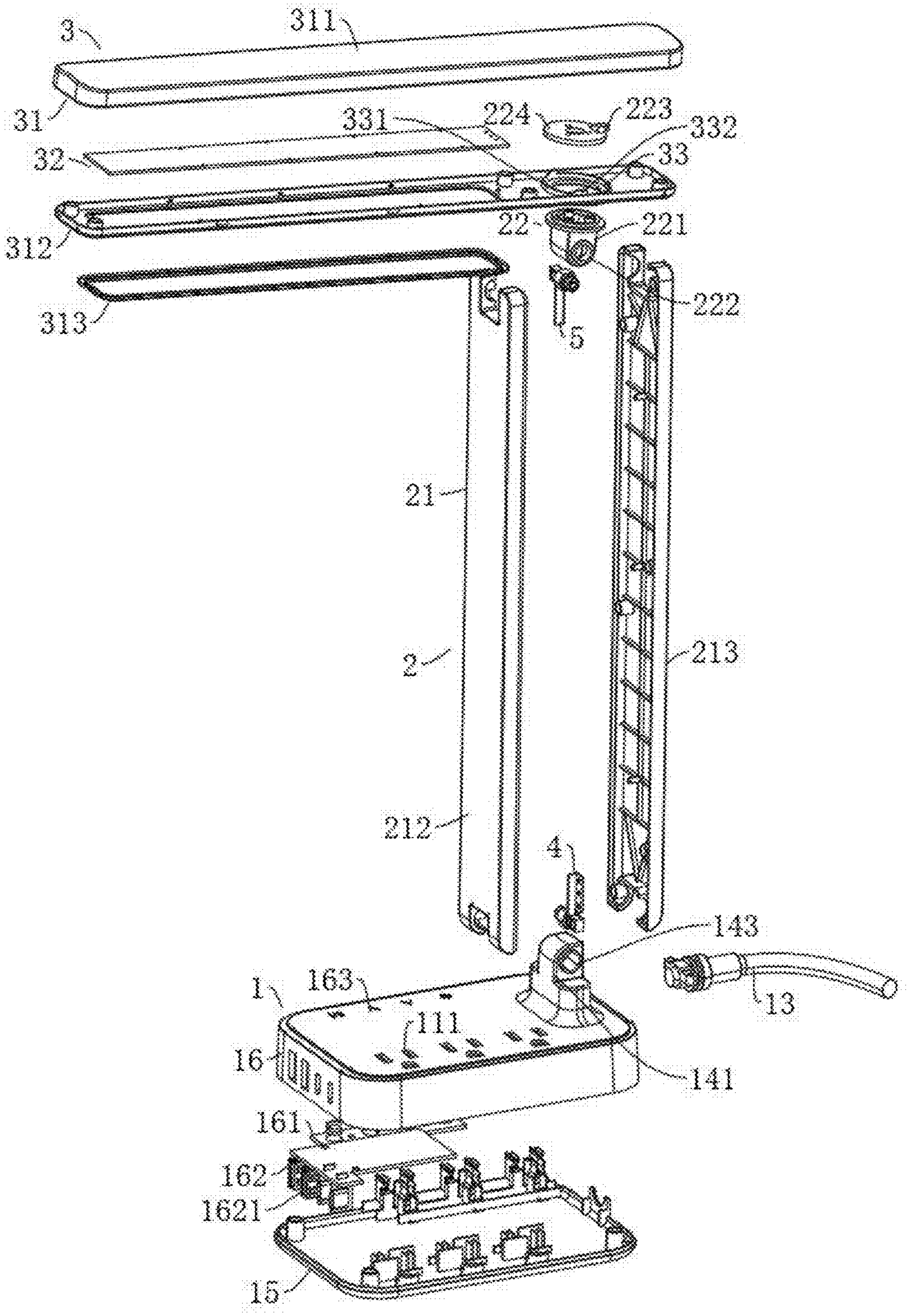
FIG. 5 is an exploded schematic diagram of the power strip with the foldable lamp of the present disclosure.
Figure 6:
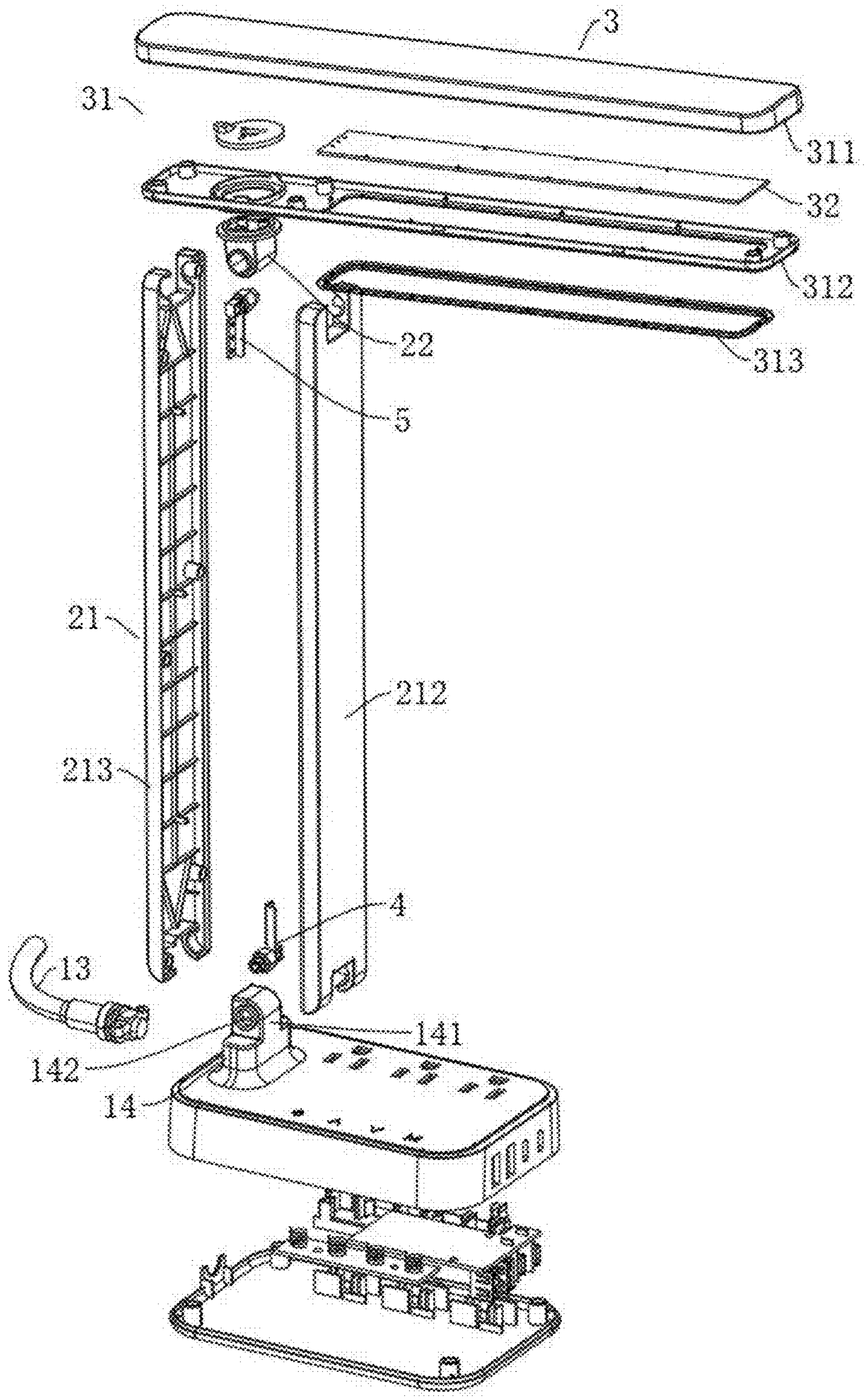
FIG. 6 is an exploded schematic diagram of the power strip with the foldable lamp viewing from another perspective of the present disclosure.
Figure 7:
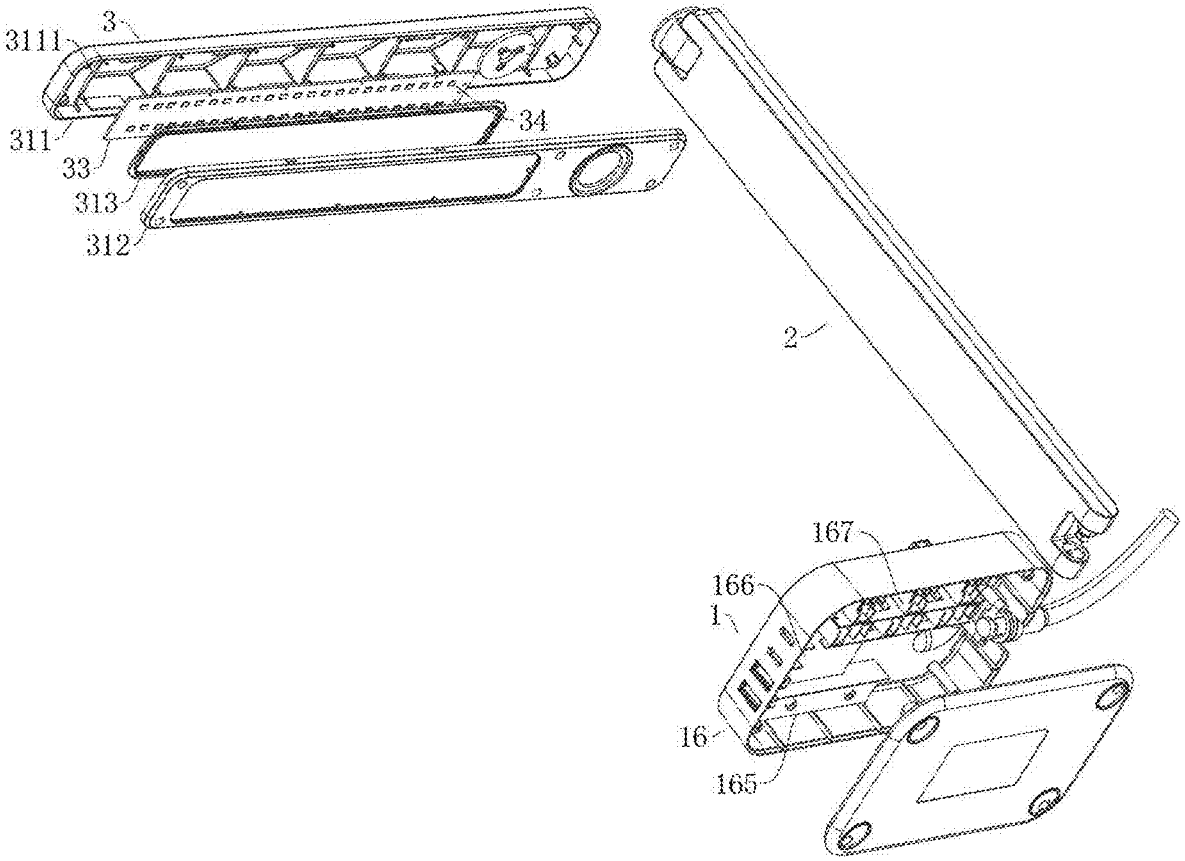
FIG. 7 is an exploded schematic diagram of the power strip with the foldable lamp viewing from another perspective of the present disclosure.
Figure 8:
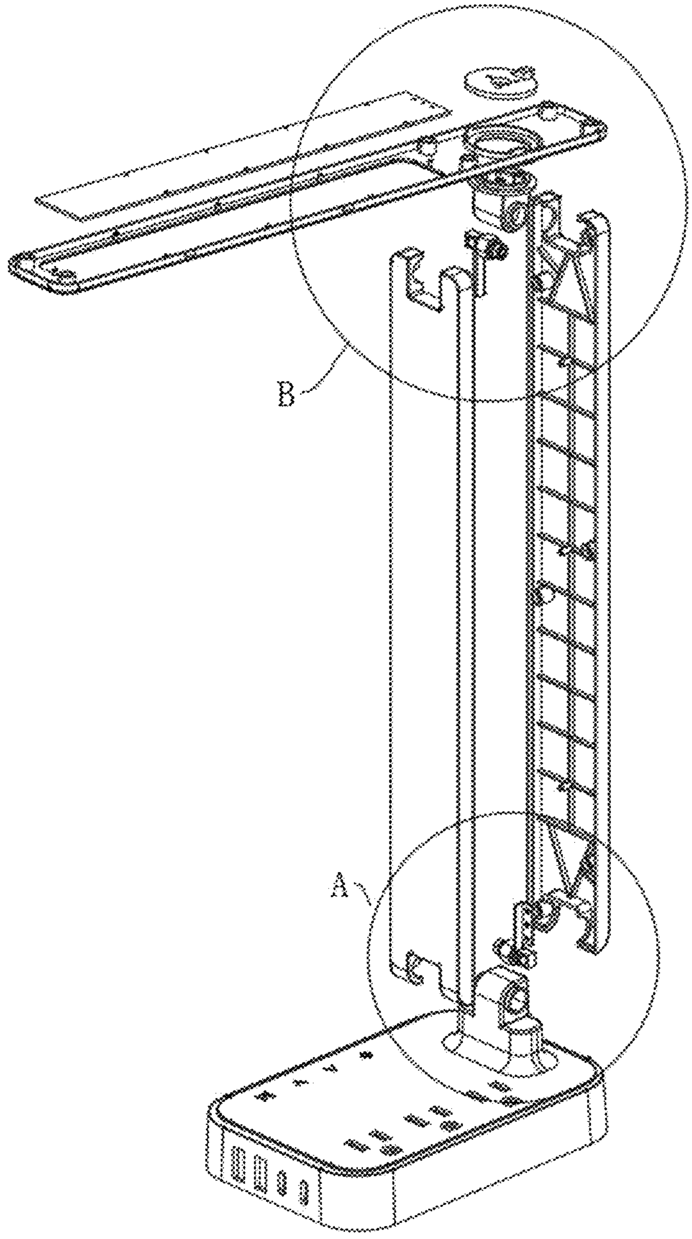
FIG. 8 is an exploded schematic diagram of the power strip with the foldable lamp viewing from another perspective of the present disclosure.
Figure 9:
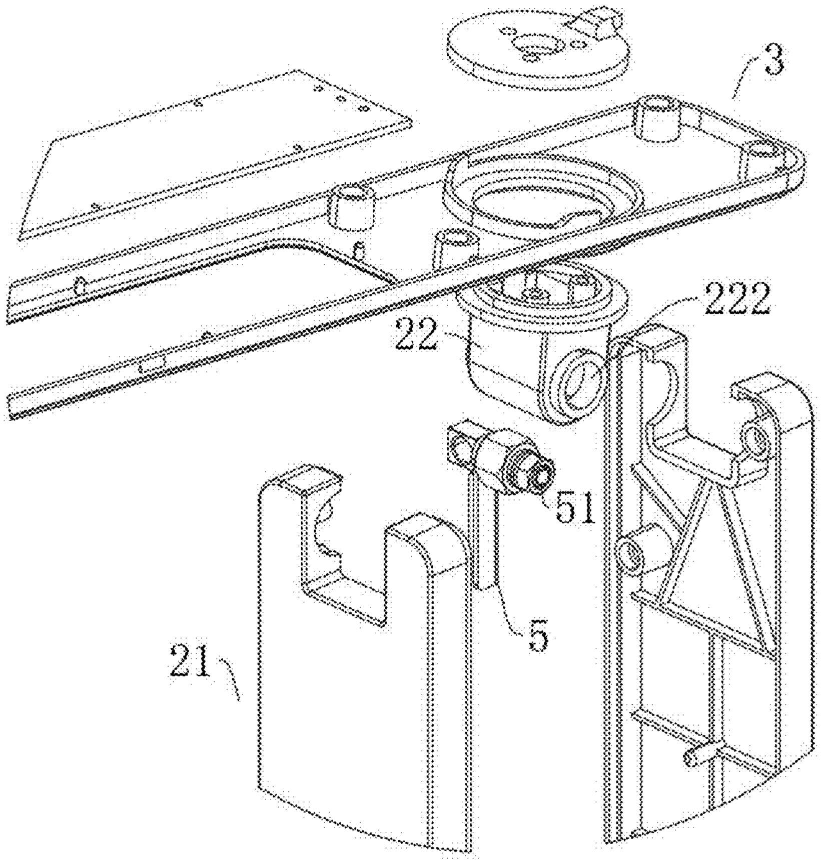
FIG. 9 is an enlarged schematic diagram of portion B shown in FIG. 8.
Figure 10:
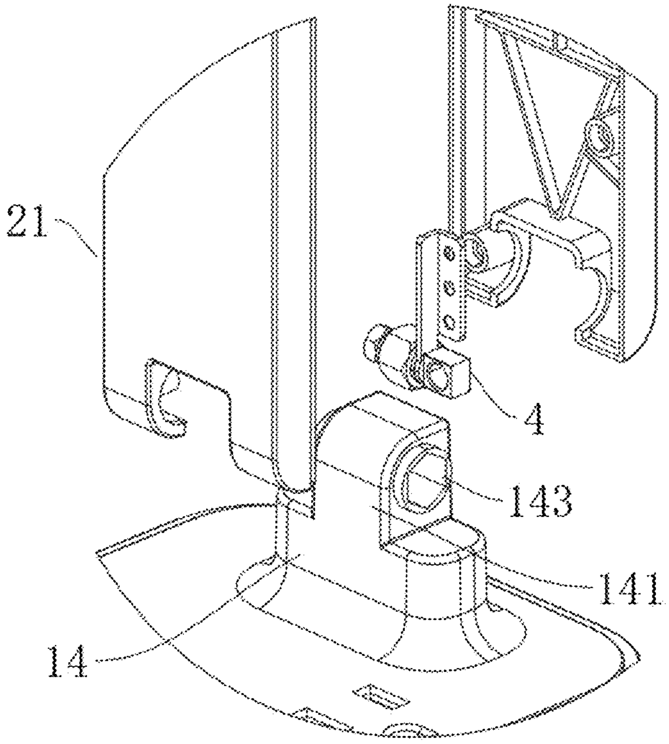
FIG. 10 is an enlarged schematic diagram of portion A shown in FIG. 8.
Figure 11:
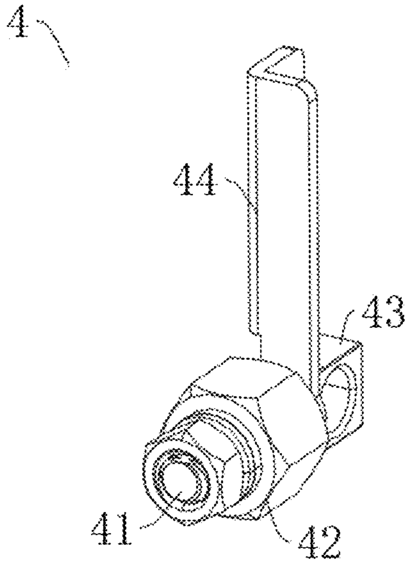
FIG. 11 is a structural schematic diagram of a first hinge component of the present disclosure.

As shown in FIGS. 1 and 5, in one embodiment, the power strip base 1 includes a bottom cover 15 and an upper housing 16, the bottom cover 15 is disposed at a bottom of the upper housing 16, and the upper housing 16 includes a first mounting portion 165, a second mounting portion 166, and a third mounting portion 167. A light control board 161 is disposed at the first mounting portion 165, a power supply control board 162 is disposed at the second mounting portion 166, the socket openings 111 and the plug-in module 12 are disposed at the third mounting portion 167. At least one light control button 163 is disposed on an upper surface of the upper housing 16, one end of the at least one light control button 163 is electrically connected to the light control board 161. Charging interfaces 1621 are disposed at one side of the power supply control board 162, one end of each of the charging interfaces 1621 extends to one side of the upper housing 16. Specifically, the connecting component 14 includes a first hinge protrusion 141, a first wiring hole 142 and a first hinge component 4 is respectively disposed at two sides of the first hinge protrusion 141, a first end of the first wiring hole 142 is communicated into the outer housing 11, a second end of the first wiring hole 142 is communicated into the foldable supporting frame 21, and the first wiring hole 142 is configured to route wires of the light source module 3. The first hinge component 4 includes a first hinge shaft 41, a first hinge damper 42, a first hinge fixing component 43, and a first connecting piece 44, a first hinge fixing groove 143 is disposed at one end of the first hinge protrusion 141, and the first hinge damper 42 is configured to fix a first end of the first hinge shaft 41 in the first hinge fixing groove 143. The first hinge fixing component 43 is disposed at a second end of the first hinge shaft 41 and is fixed in the foldable supporting frame 21. The first connecting piece 44 is disposed between the first hinge damper 42 and the first hinge fixing component 43, a first end of the first connecting piece 44 is rotatably connected to the first hinge shaft 41, and a second end of the first connecting piece 44 is fixedly disposed in the foldable supporting frame 21. In the embodiment, through an ingenious combination of the bottom cover 15 and the upper housing 16, the power strip base 1 has better structural stability and also achieves effective layout and protection of internal components. The first mounting portion 165, the second mounting portion 166, and the third mounting portion 167 disposed on the upper housing 16 are respectively configured to accommodate key components, such as the light control board 161, the power supply control board 162, and the socket openings 111, etc. Such modular design significantly enhances the functionality and maintainability of the power strip. Integration of the light control board 161 allows the users to easily adjust brightness of the foldable lamp and switch a power status of the foldable lamp through the at least one light control button 163 disposed on the upper surface of the upper housing 16, which provides significant convenience. Meanwhile, an electrical connection design between the at least one light control button 163 and the light control board 161 ensures stable signal transmission and rapid response times, which further improves user experience. The charging interfaces 1621 disposed on the power supply control board 162 not only meet charging needs of various devices but each is also designed to extend to the one side of the upper housing 16 for easier plug-in and removal by the users, thereby reducing operational barriers. Moreover, such design further considers problems of wiring and connection of the foldable supporting frame 21 By providing the first hinge protrusion 141 and its corresponding first wiring hole 142 along with the first hinge component 4, orderly management of the wiring for the light source module 3 is achieved, which ensures aesthetic appeal and further avoids potential safety hazards caused by disorganized wiring. The detailed design of the first hinge component 4, particularly the application of the first hinge damper 42, not only ensures a stable hinge connection between the foldable supporting frame 21 and the power strip base 1 but also provides appropriate damping effects, which allows the users to experience smooth and stable operation when adjusting the angle of the foldable lamp. Moreover, cooperation between the first hinge fixing component 43 and the first connecting piece 44 further enhances structural stability of the foldable lamp, so as to ensure stability and durability of the foldable lamp during long-term use.

Figure 2:
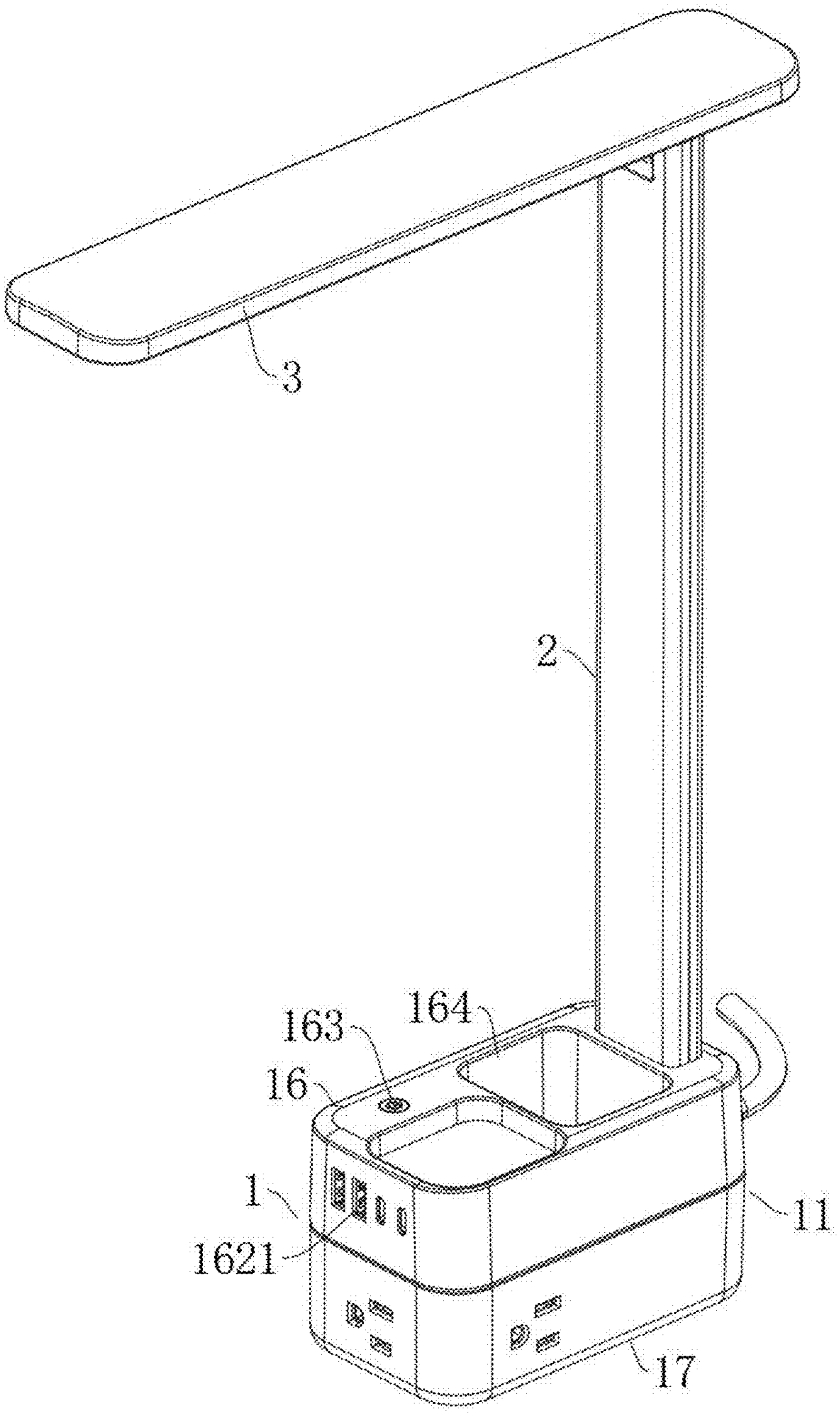
FIG. 2 is a three-dimensional schematic diagram of the power strip with the foldable lamp according to another embodiment of the present disclosure.
Figure 3:
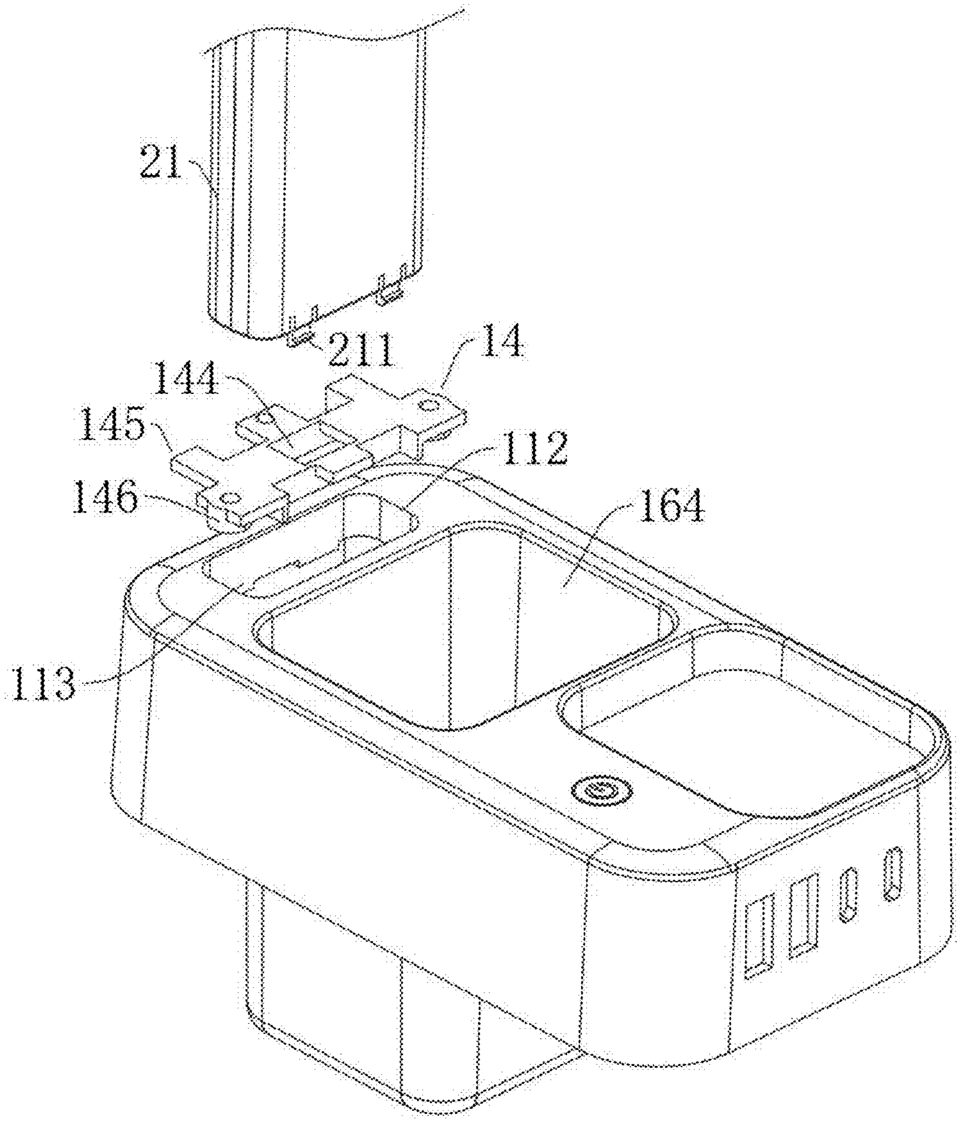
FIG. 3 is a structural schematic diagram of a connecting component according to one embodiment of the present disclosure.
Figure 4:
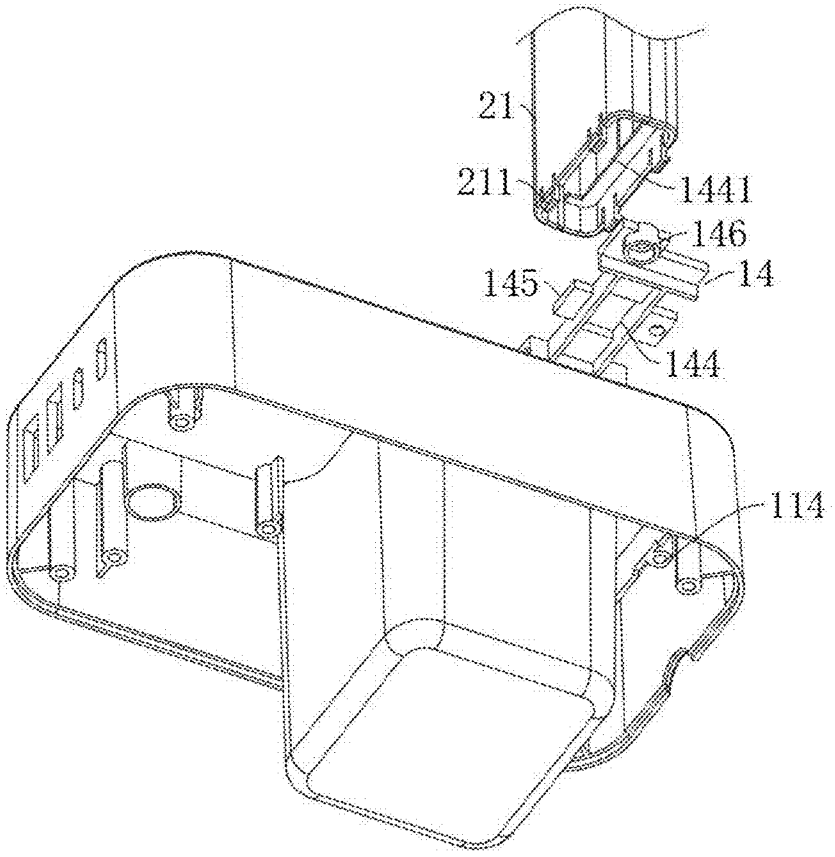
FIG. 4 is a structural schematic diagram of the connecting component according to one embodiment of the present disclosure.

As shown in FIGS. 2-4, in another embodiment, the power strip base 1 includes a lower housing 17 and the upper housing 16, the upper housing 16 and the lower housing 17 are connected to each other, and an item placement groove 164 is disposed on the upper surface of the upper housing 16. The second mounting portion 166 is disposed in the upper housing 16, the third mounting portion 167 is disposed at one side of the lower housing 17 close to the second mounting portion 166, the power supply control board 162 is disposed at the second mounting portion 166, the at least one light control button 163 is disposed on the upper surface of the upper housing 16, one end of the at least one light control button 163 is electrically connected to the power supply board 162, charging interfaces 1621 are disposed at the one side of the power supply control board 162, one end of each of the charging interfaces 1621 extends to the one side of the upper housing 16. The socket openings 111 are disposed at a side surface of the lower housing 17, and the plug-in module 12 is disposed on the lower housing 17. Specifically, the outer housing 11 includes an assembling groove 112, an outer edge of the assembling groove 112 extends toward an interior of the outer housing 11 to form a connecting portion 113, the foldable supporting frame 21 includes at least one hooking portion 211 at the second end thereof, the at least one hooking portion 211 is configured to hook onto the connecting portion 113. Connecting columns 114 are disposed at an outer side of the connecting portion 113, the connecting component 133 includes an inserting wire groove 144, a fixing limitation plate 145, and connecting rings 146, the fixing limitation plate 145 is disposed at a first end of the inserting wire groove 144, the connecting rings 146 are disposed on a periphery of the inserting wire groove 145, and the connecting rings 146 are configured to respectively connect to the connecting columns 114 through inserting screws. The foldable supporting frame includes a fixing insertion groove 1441 at the second end thereof, a second end of the inserting wire groove 144 is inserted into the fixing insertion groove 1441, one surface of the fixing limitation plate 145 abuts against an end surface of the connecting portion 113. In the embodiment, the item placement groove 164 is disposed on the upper housing 16 for the users to conveniently place small electronic devices, such as mobile phones, tablets, etc., items are better stored while charging, thereby improving space utilization. Meanwhile, the second mounting portion 166 disposed in the upper housing 16 cooperates with the third mounting portion 167 of the lower housing 17 to provide a stable installation environment for core components, such as the power supply control board 162, so as to overall structural stability of the power strip. Moreover, the at least one light control button 163 allows the users to easily control the power status of the foldable lamp and adjust the brightness of the foldable lamp, which provides great convenience for nighttime use. The charging interfaces 1621 are disposed at the one side of the power supply control board 162, so as to meet different charging needs of various devices, and the charging interfaces 1621 extend to the one side of the upper housing 16, which facilitates neat cable management alongside the power strip, and a problem of tangled wires is avoided. Additionally, the foldable supporting frame 21 is a significant highlight of the present disclosure. By hooking the hooking portion 211 onto the connecting portion 113 and cooperation between the inserting wire groove 144, the fixing limitation plate 145, and the connecting rings 146 of the connecting component 14, the foldable supporting frame 21 is capable of firmly supporting the light source module 3 and is also foldable to be folded by the users for storage as needed. Such design not only saves space but also enhances the portability of the power strip. Regarding configuration of the socket openings 111, the socket openings 111 are disposed at the side surface of the lower housing 17, which is convenient for the users to plug in and unplug power plugs while also preventing the socket openings from being accidentally touched or damaged. Meanwhile, the plug-in module 12 allows the power strip to connect to other functional modules for extended functionality, so as to further enhance versatility of the power strip.

The rotating disc 22 includes a second hinge protrusion 221 at one end thereof, a second wiring hole 222 and a second hinge component 5 are respectively disposed at two sides of the second hinge protrusion 221, a first end of the second wiring hole 222 is communicated into the lamp frame 31, a second end of the second wiring hole 222 is communicated into the foldable supporting frame 21, and the second wiring hole 222 is configured to route wires of the light source module 3. The second hinge component 5 includes a second hinge shaft 51, a second hinge damper 52, a second hinge fixing component 53, and a second connecting piece 54, a second hinge fixing groove is disposed at one end of the second hinge protrusion 221, and the second hinge damper 52 is configured to fix a first end of the second hinge shaft 51 in the second hinge fixing groove. The second hinge fixing component 53 is disposed at a second end of the second hinge shaft 51 and is fixed in the foldable supporting frame 21, the second connecting piece 54 is disposed between the second hinge damper 52 and the second hinge fixing component 53, a first end of the second connecting piece 54 is rotatably connected to the second hinge shaft 51, and a second end of the second connecting piece 54 is fixedly disposed in the foldable supporting frame 21. In the embodiment, the second hinge protrusion 221 not only enhances connection strength between the rotating disc 22 and the foldable supporting frame 21 but also ingeniously incorporates the second wiring hole 222. Such innovative design allows the wires of the light source module 3 to smoothly and discreetly pass through, thereby maintaining overall neatness and aesthetic appeal of the power strip with the foldable lamp. Meanwhile, the first end and the second end of the second wiring hole 222 are respectively communicated into the outer housing 11 and the foldable supporting frame 21, which provides a convenient wiring channel for the light source module 3, so as to greatly simplify installation and maintenance processes. Moreover, the second hinge component 5 is further provided to enhance practicality and stability of the power strip with the foldable lamp. Specifically, combination of the second hinge shaft 51 and the second hinge damper 52 ensures smoothness and controllability of the rotating disc 22 during folding of the foldable supporting frame 21, so as to effectively avoid a risk of damage caused by over-folding or sudden rotations. Furthermore, the second hinge fixing component 53 and the second connecting plate 54 cooperate to reinforce connection between the rotating disc 22 and the foldable supporting frame 21, so that the power strip with the foldable lamp maintains excellent stability and durability, whether the foldable supporting frame 21 is unfolded or folded.

A protruding ring 331 is disposed on an inner side of the rotating connection groove 33 facing the lamp frame 31, limiting protrusions 332 are respectively disposed at two sides of the protruding ring 331, protruding blocks 223 are disposed on one surface of the rotating disc 22, each of the protruding blocks 223 includes an assembling step 224, each assembling step 224 is configured to match with a corresponding one of the limiting protrusions 332. The rotating disc 22 is limited through respectively abutting the protruding blocks 223 against the limiting protrusions 332 during rotation. In the embodiment, the limiting protrusions 332 are ingeniously disposed at the two sides of the protruding ring 331. The limiting protrusions 332 not only enhance structural stability but also provide precise guidance and positioning for the protruding blocks 223 on the rotating disc 22. A design of the protruding blocks 223 is equally meticulous, each featuring the assembling step 224 that perfectly matches with a corresponding one of the limiting protrusions 332. When the rotating disc 22 rotates, the protruding blocks 223 smoothly move along the limiting protrusions 332 until reaching predetermined positions thereof to abut against the limiting protrusions 332, thereby achieving precise angle locking. Such process ensures that the light source module 3 is capable of freely adjusting to meet user needs while preventing any accidental loosening or shifting during use. Moreover, such design further takes into full consideration of convenience and safety of use. With a simple rotating motion, the users may easily fold and unfold the foldable lamp without complex operational steps. Meanwhile, a stable limiting mechanism effectively prevents the foldable lamp from collapsing due to external forces after angle adjustments, thereby providing a safer and more reliable environment for the users.

The lamp frame 31 includes a lamp cover 311 and a cover plate 312, the lamp cover 311 is disposed at one side of the cover plate 312, a lampshade 313 is disposed on the cover plate 312, the light-emitting module 32 includes a light-emitting plate 33 and a light source 34, the light source 34 is disposed on the light-emitting plate 33, the light-emitting plate 33 is disposed on the lamp cover 311, and the light source 34 emits light toward the lampshade 313. A pressing block 3111 is disposed on the lamp cover 311, and the pressing block 3111 is configured to press and assemble the lampshade 313 on the cover plate 312. In the embodiment, a structural design of the lamp frame 31 is compact and rational. Ingenious combination of the lamp cover 311 and the cover plate 312 not only ensures the aesthetic appeal of the power strip with the foldable lamp but also significantly enhances the stability thereof. The lamp cover 311 is disposed at the one side of the cover plate 312, which facilitates easy installation and maintenance while effectively protecting the light-emitting module 32 internally disposed from dust and debris, thereby extending a service life of the light-emitting module 32. Moreover, the light-emitting module 32 is particularly crucial. The light-emitting plate 33 is disposed on the lamp cover 311 with the light source 34 emitting the light toward the lampshade 313, so as to allow the light to be evenly and efficiently emitted to provide sufficient lighting for the users. Meanwhile, high-quality materials used for both the light-emitting plate 33 and the light source 34 ensure stable brightness and color temperature, so as to meet needs of the users in lighting in various scenarios. Furthermore, the pressing block 3111 is a masterstroke of the present disclosure. The pressing block 3111 is configured to press and assemble the lampshade 313 on the cover plate 312, which ensures stability of the lampshade 313 while preventing noise and safety hazards caused by loosening. Furthermore, the adjustability of the pressing block 3111 allows the users to easily adjust an angle and position of the lampshade 313 according to actual needs, thereby achieving a more personalized lighting effect.

Figure 12:
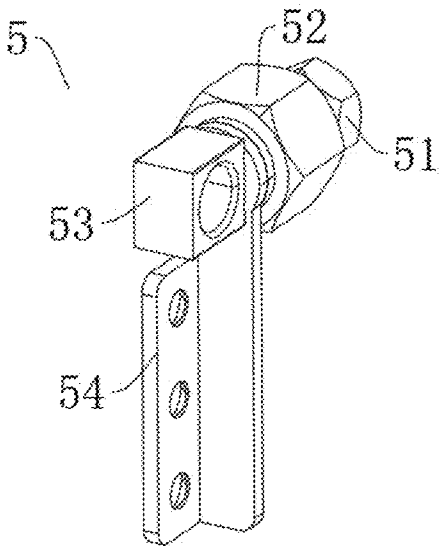
FIG. 12 is a structural schematic diagram of a second hinge component of the present disclosure.
Figure 13:
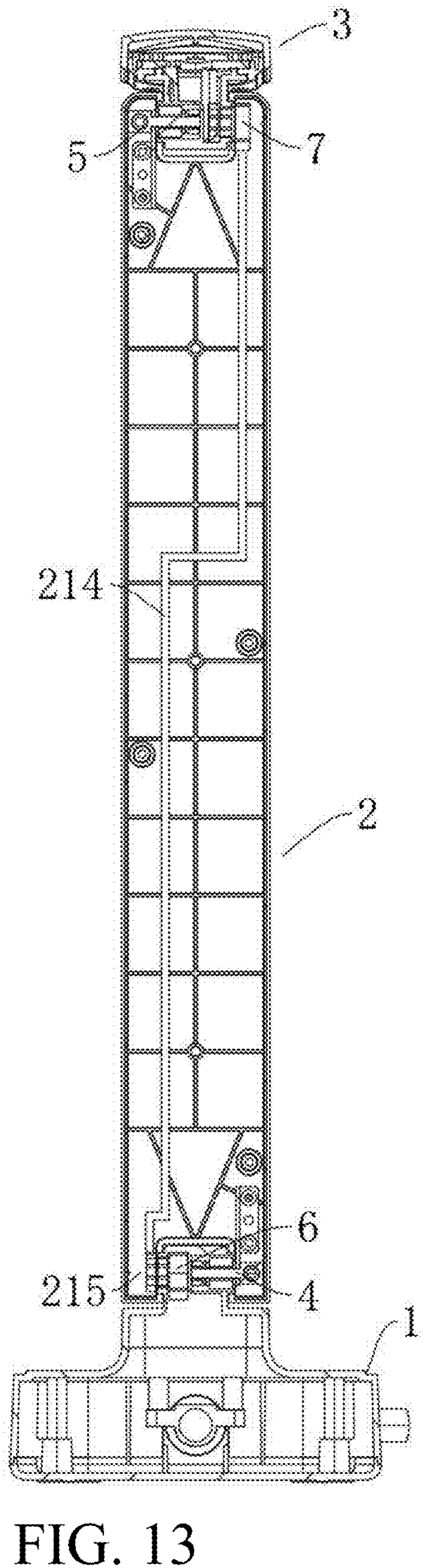
FIG. 13 is an internal structural schematic diagram of a foldable supporting frame of the present disclosure.
Figure 14:
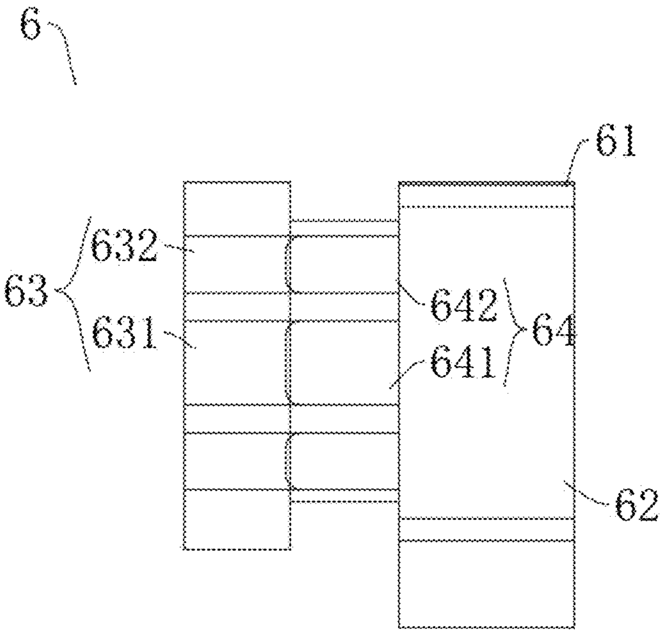
FIG. 14 is a structural schematic diagram of a first power connection component of the present disclosure.
Figure 15:
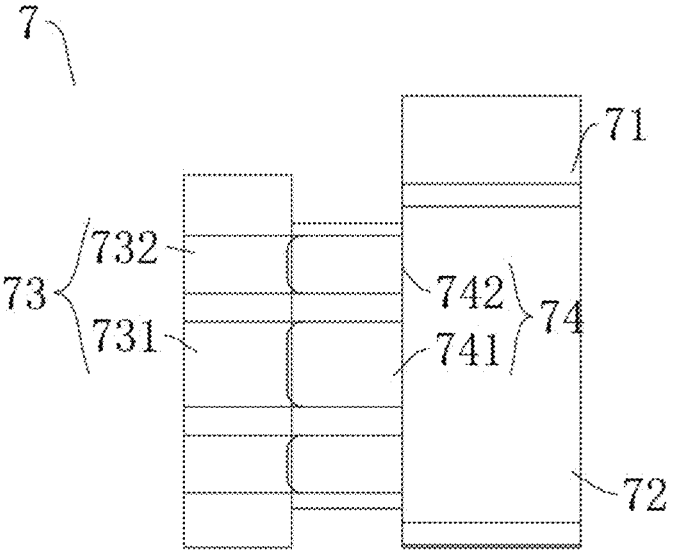
FIG. 15 is a structural schematic diagram of a second power connection component of the present disclosure.

As shown in FIGS. 12-14, the foldable supporting frame 21 includes a first supporting housing 212 and a second supporting housing 213, the first supporting housing 212 and the second supporting housing 213 are mutually engaged to form an inner cavity, the inner cavity includes a wiring groove 214, a connecting wire 13 is disposed in the wiring groove 214, and a first power connection component 6 and a second power connection component 7 are respectively disposed at two ends of the connecting wire 13. The first power connection component 6 includes a first fixing disc 61, a first hinge disc 62, a first conductive connection ring 63, and a first elastic contact piece 64, the inner cavity includes a first fixing concave groove 215 at one side opposite to the first wiring hole 142, the first conductive connection ring 63 is disposed on the first fixing disc 61, the first elastic contact piece 64 is disposed on the first hinge disc 62, a first end of the first elastic contact piece 64 is electrically connected to the connecting wire 13, and a second end of the first elastic contact piece 64 is electrically connected to the first conductive connection ring 63. In the embodiment, the foldable supporting frame 21 is constructed by mutually engaging the first supporting housing 212 and the second supporting housing 213, which ensures a compact structure for easy portability and storage. Moreover, the inner cavity along with the wiring groove 214 formed in the foldable supporting frame 21 further provides an orderly and safe layout space for the connecting wire 13 of the power strip with the foldable lamp. In the inner cavity, the wiring groove 214 allows the connecting wire 13 to be neatly arranged, solving a problem of tangled wires found in conventional power strips, which enhances both the aesthetic appeal and practicality of the power strip with the foldable lamp. Additionally, the first power connection component 6 and the second power connection component 7 at the two ends of the connecting wire 13 ensure stable current transmission, and an innovative design of the first power connection component 6 is particularly noteworthy. The first power connection component 6 achieves a reliable connection with the connecting wire 13 through ingenious combination of the first fixing plate disc, the first hinge plate 62, the first conductive connection ring 63, and the first elastic contact piece 64, which ensures both stability and safety during current transmission. The first elastic contact piece 64 ensures that the connecting wire 13 maintains good conductivity even when being subjected to external forces, which prevents problems, such as poor contact due to loose connections caused by movement or external pressure.

The first conductive connection ring 63 includes a first conductive inner ring 631 and a first conductive outer ring 632, the first elastic contact piece 64 includes a first inner contact piece 641 and a first outer contact piece 642, one end of the first inner contact piece 641 is configured to contact the first conductive inner ring 631, one end of the first outer contact piece 642 is configured to contact the first conductive outer ring 632. The second power connection component 7 includes a second fixing disc 71, a second hinge disc 72, a second conductive connection ring 73, and a second elastic contact piece 74, a second inner cavity includes a second fixing concave groove 75 at one side opposite to the second wiring hole 222, the second hinge disc 72 is disposed in the second fixing concave groove 75, the second fixing disc 71 is disposed on the second wiring hole 222, the second conductive connection ring 73 is disposed on the second fixing disc 71, the second elastic contact piece 74 is disposed on the second hinge disc 72, a first end of the second elastic contact piece 74 is electrically connected to the connecting wire 13, and a second end of the second elastic contact piece 74 is electrically connected to the second conductive connection ring 73. The second conductive connection ring 73 includes a second conductive inner ring 731 and a second conductive outer ring 732, the second elastic contact piece 74 includes a second inner contact piece 741 and a second outer contact piece 742, one end of the second inner contact piece 741 is configured to contact the second conductive inner ring 731, one end of the second outer contact piece 742 is configured to contact the second conductive outer ring 732. The second conductive connection ring 73 is configured to electrically connect to the light source module 3. In the embodiment, the first conductive connecting ring 63 and the first elastic contact piece 64 cooperate to ensure that the foldable supporting frame 21 maintains good electrical contact with the power strip base 1, the foldable supporting frame 21 is unfolded or folded. Specifically, the first inner contact piece 641 and the first outer contact piece 642 are respectively and precisely aligned with the first conductive inner ring 631 and the first conductive outer ring 632. Such dual-contact design not only enhances stability of the current transmission but also improves durability of connection. An ingenious layout of the second power connection component 7 further improves convenience and security of use of the foldable lamp. Arrangement of the second fixing disc 71 and the second hinge disc 72 enables the foldable lamp to be flexibly folded and unfolded while ensuring stable connection. Regarding the second conductive connection ring 73 and the second elastic contact piece 74 on the second conductive connection ring 73, the second inner contact piece 741 and the second outer contact piece 742 are in close contact with the second conductive inner ring 731 and the second conductive outer ring 732, so as to ensure continuous current transmission in a folding structure, thereby ensuring a normal operation of the foldable lamp. Moreover, the second conductive connection ring 73 is directly electrically connected to the light source module 3, which simplifies a current transmission path, reduces energy consumption, and further improves overall lighting efficiency of the foldable lamp.

The connecting wire 13 is a flexible printed circuit (FPC) connecting wire 13, one surface of the FPC connecting wire 13 is attached to the wiring groove 214, a first contact pad 131 and a second contact pin 132 are respectively disposed at two ends of the FPC connecting wire 13, the first contact pin 131 is configured to connect to the first elastic contact piece 64, and the second contact pin 132 is configured to connect to the second elastic contact piece 74. In the embodiment, the FPC connecting wire 13 is in close contact with the wiring groove 214 with light, thin, and flexible characteristics thereof, which not only greatly saves space, but also ensures stability and reliability of connection. On the one hand, a first end of the FPC connecting wire 13 is connected to the first elastic contact piece 64 through the first contact pad 131, and a second end of the FPC connecting wire 13 is connected to the second elastic contact piece 74 through the second contact pad 132, which achieves highly efficient and precise current transmission. During folding and unfolding of the power strip with the foldable lamp, the FPC connecting wire 13 maintains a good electrical connection, thereby avoiding a risk of disconnection or short circuit caused by folding, thereby ensuring stable power supply and signal transmission of the power strip with the foldable lamp. On the other hand, the FPC connecting wire 13 further improves the overall aesthetic appeal and durability of the power strip with the foldable lamp. Such a light and thin design enables the power strip with the foldable lamp to be more compact, lightweight, and convenient to carry and store. Meanwhile, the FPC connecting wire 13 has good bending resistance and distortion resistance, which is capable of withstanding mechanical stress caused by frequent folding, and prolongs a service life of the power strip with the foldable lamp.

The present disclosure further provides a light control method based on the power strip with the foldable lamp, including following steps.

Collecting ambient light data and device space attitude data in real time by an ambient light sensor and an attitude sensor.

Parsing signals from an angle encoder of the foldable arm, and predicting a movement trajectory of the foldable arm in combination with historical motion data.

Automatically matching preset lighting modes according to a folding angle interval, wherein the preset light modes at least include a parameter combination of brightness, color temperature, and power supply strategy.

Implementing hybrid output of red, green, blue, white (RGBW) four-color light emitting diodes (LEDs) by multi-channel pulse width modulation (PWM) dimming control.

Dynamically compensating light distribution in three-dimensional space through a sensor data fusion algorithm.

Mapping relationships between a folding angle range of the foldable arm and lighting modes are as follows.

Activating a night lamp mode and outputting light having a color temperature of 2000K±100K and a brightness level of 10%+2% of the maximum when a folding angle of the foldable arm is in a range of 0-30°.

Activating a reading mode and outputting light having a color temperature of 4000K±200K and a brightness level of 70%+5% of the maximum when a folding angle of the foldable arm is in a range of 30-90°.

Activating a work mode and outputting light having a color temperature of 5000K±300K and a brightness level at the maximum when a folding angle of the foldable arm is in a range of 90-180°.

The multi-channel PWM dimming control specifically includes following steps.

Compensating an LED nonlinear response by a 12-bit precision gamma correction algorithm.

Controlling driving current of each of the RGBW four-color LEDs independently through four separate PWM signals.

Executing smooth transitions of brightness and color temperature during mode switching, with a fade time adjustable between 50-200 ms.

The dynamically compensating the light distribution in the three-dimensional space includes following steps.

Acquiring pitch, yaw, and roll angles of the power strip with the foldable lamp by a six-axis inertial measurement unit (IMU).

Calculating theoretical illumination intensity of a working surface based on a light reflection model.

Dynamically adjust LED output power according to the difference between measured values from the ambient light sensor and theoretical values.

The light control method based on the power strip with the foldable lamp further provides a gesture control function, which is specifically implemented as follows.

Detecting two-finger sliding operations through a capacitive touch array, with a sliding distance linearly related to a brightness adjustment amount.

Recognizing rotational gestures, where a rotation angle is mapped to a color temperature adjustment amount, achieving a precision of +50K per degree.

Defining pressure-sensitive areas on a touch surface to distinguish between a light touch for power on/off operations and a long press for mode switching operations.

The power supply strategy is as follows.

Automatically disabling a USB power supply port when the folding angle of the foldable arm is less than 45°.

Initiating dynamic current limiting protection when a total load power exceeds 80 W.

Intelligently allocating USB power delivery (PD) output profiles based on a type of a connected device.

The light control method based on the power strip with the foldable lamp further provides an intelligent learning function, which is specifically implemented as follows.

Employing a long short-term memory (LSTM) neural network to record user adjustment habits and establishing a time-angle-light parameter correlation model.

Automatically generating personalized lighting schemes based on historical usage data.

Initiating a security audit process when an abnormal operation mode is detected.

A wireless control protocol is as follows.

Defining a standard control command frame structure, including 1 byte for a command type, 2 bytes for a brightness value, 2 bytes for a color temperature value, and 1 byte for a scene mode.

Supporting a command broadcast retransmission mechanism during Bluetooth Low Energy (BLE) Mesh networking.

Employing a Message Queuing Telemetry Transport (MQTT) protocol to achieve JavaScript Object Notation (JSON) data interaction with smart home platforms in Wi-Fi mode.

A safety protection mechanism is as follows.

Monitoring a temperature of an LED driving circuit in real time and executing a gradient power reduction operation when the temperature reaches or exceeds 75° C.

Immediately cutting off a main power supply and activating ground protection when a leakage current exceeding 10 mA is detected.

Executing Cyclic Redundancy Check 32-bit (CRC32) checksum verification and command whitelist filtering on wireless control commands.

In the embodiment, by integrating the ambient light sensor, the attitude sensor, and the angle encoder of the foldable arm, precise perception and prediction of ambient light and device attitude are achieved, thereby providing the users with a lighting experience that closely matches actual needs. Meanwhile, the preset lighting modes are automatically matched according to the folding angle interval, which not only simplifies user operations but also ensures a high degree of alignment between lighting effects and usage scenarios. Furthermore, through the multi-channel PWM dimming control, particularly with the 12-bit precision gamma correction algorithm, the LED nonlinear response is effectively compensated, thereby achieving fine hybrid output of the RGBW four-color LEDs. Moreover, smooth transitions in the brightness and the color temperature further enhance fluidity of the user experience. Regarding the compensation of the light distribution in the three-dimensional space, the light control method based on the power strip with the foldable lamp achieves precise control of the illumination intensity on the working surface by fusing data from the six-axis IMU and the ambient light sensor, a problem of uneven lighting is effectively avoided. The gesture control function is additionally provided to provide a more convenient operation method for the users, which allows brightness adjustment, color temperature modification, and mode switching of the power strip with the foldable lamp to be completed through simple hand gestures.

The intelligent learning function and a wireless control function of the light control method based on the power strip with the foldable lamp are capable of recording user habits, generating the personalized lighting schemes, and supporting different wireless protocols, achieving seamless integration with the smart home platforms. Regarding the safety protection mechanism, the light control method based on the power strip with the foldable lamp also excels by monitoring the temperature of the LED driving circuit in real time, detecting the leakage current, and executing the CRC32 checksum verification and command whitelist filtering on the wireless control commands to ensure safe and stable operation of the power strip with the foldable lamp.

The above embodiments only express several embodiments of the present disclosure, and description thereof is relatively specific and detailed, but cannot be understood as a limitation to a patent scope of the present disclosure. It should be noted that, for those skilled in the art, several modifications and improvements may be made without departing from a concept of the present disclosure, which all fall within a protection scope of the present disclosure. Therefore, the protection scope of the present disclosure shall be subject to appended claims.

What is claimed is:

1. A power strip with a foldable lamp, comprising:

a power strip base;

a foldable arm; and a light source module;

wherein the power strip base comprises an outer housing, a plug-in module, and a power cord, the plug-in module is disposed in the outer housing, socket openings are disposed on the outer housing and are aligned with the plug-in module, the power cord is disposed at a first side of the outer housing and is configured to electrically connect to the plug-in module;

a connecting component is disposed at a second side of the outer housing, and the connecting component is configured to connect to the foldable arm;

the foldable arm comprises a foldable supporting frame and a rotating disc, a first end of the foldable supporting frame is hinged to the connecting component, and a second end of the foldable supporting frame is hinged to the rotating disc;

the light source module comprises a lamp frame and a light-emitting module, the light-emitting module is disposed on the lamp frame, a rotating connection groove is disposed at one side of the lamp frame, and the rotating disc is disposed on the rotating connection groove;

the lamp frame comprises a lamp cover and a cover plate, the lamp cover is disposed at one side of the cover plate, a lampshade is disposed on the cover plate, the light-emitting module comprises a light-emitting plate and a light source, the light source is disposed on the light-emitting plate, the light-emitting plate is disposed on the lamp cover, and the light source emits light toward the lampshade; and a pressing block is disposed on the lamp cover, and the pressing block is configured to press and assemble the lampshade on the cover plate.

2. The power strip with the foldable lamp according to claim 1, wherein the power strip base comprises a bottom cover and an upper housing, the bottom cover is disposed at a bottom of the upper housing, and the upper housing comprises a first mounting portion, a second mounting portion, and a third mounting portion;

a light control board is disposed at the first mounting portion, a power supply control board is disposed at the second mounting portion, the socket openings and the plug-in module are disposed at the third mounting portion;

at least one light control button is disposed on an upper surface of the upper housing, one end of the at least one light control button is electrically connected to the light control board; and charging interfaces are disposed at one side of the power supply control board, one end of each of the charging interfaces extends to one side of the upper housing.

3. The power strip with the foldable lamp according to claim 1, wherein the connecting component comprises a first hinge protrusion, a first wiring hole and a first hinge component is respectively disposed at two sides of the first hinge protrusion, a first end of the first wiring hole is communicated into the outer housing, a second end of the first wiring hole is communicated into the foldable supporting frame, and the first wiring hole is configured to route wires of the light source module;

the first hinge component comprises a first hinge shaft, a first hinge damper, a first hinge fixing component, and a first connecting piece, a first hinge fixing groove is disposed at one end of the first hinge protrusion, and the first hinge damper is configured to fix a first end of the first hinge shaft in the first hinge fixing groove; and the first hinge fixing component is disposed at a second end of the first hinge shaft and is fixed in the foldable supporting frame, the first connecting piece is disposed between the first hinge damper and the first hinge fixing component, a first end of the first connecting piece is rotatably connected to the first hinge shaft, and a second end of the first connecting piece is fixedly disposed in the foldable supporting frame.

4. The power strip with the foldable lamp according to claim 1, wherein the power strip base comprises a lower housing and an upper housing, the upper housing and the lower housing are connected to each other, and an item placement groove is disposed on an upper surface of the upper housing;

a second mounting portion is disposed in the upper housing, a third mounting portion is disposed at one side of the lower housing close to the second mounting portion, a power supply control board is disposed at the second mounting portion, at least one light control button is disposed on the upper surface of the upper housing, one end of the at least one light control button is electrically connected to the power supply board, charging interfaces are disposed at one side of the power supply control board, one end of each of the charging interfaces extends to one side of the upper housing; and the socket openings are disposed at a side surface of the lower housing, and the plug-in module is disposed on the lower housing.

5. The power strip with the foldable lamp according to claim 4, wherein the outer housing comprises an assembling groove, an outer edge of the assembling groove extends toward an interior of the outer housing to form a connecting portion, the foldable supporting frame comprises at least one hooking portion at the second end thereof, the at least one hooking portion is configured to hook onto the connecting portion;

connecting columns is disposed at an outer side of the connecting portion, the connecting component comprises an inserting wire groove, a fixing limitation plate, and connecting rings, the fixing limitation plate is disposed at a first end of the inserting wire groove, the connecting rings are disposed on a periphery of the inserting wire groove, and the connecting rings are configured to respectively connect to the connecting columns through inserting screws;

the foldable supporting frame comprises a fixing insertion groove at the second end thereof, a second end of the inserting wire groove is inserted into the fixing insertion groove, one surface of the fixing limitation plate abuts against an end surface of the connecting portion;

the rotating disc comprises a second hinge protrusion at one end thereof, a second wiring hole and a second hinge component are respectively disposed at two sides of the second hinge protrusion, a first end of the second wiring hole is communicated into the lamp frame, a second end of the second wiring hole is communicated into the foldable supporting frame, and the second wiring hole is configured to route wires of the light source module;

the second hinge component comprises a second hinge shaft, a second hinge damper, a second hinge fixing component, and a second connecting piece, a second hinge fixing groove is disposed at one end of the second hinge protrusion, and the second hinge damper is configured to fix a first end of the second hinge shaft in the second hinge fixing groove; and the second hinge fixing component is disposed at a second end of the second hinge shaft and is fixed in the foldable supporting frame, the second connecting piece is disposed between the second hinge damper and the second hinge fixing component, a first end of the second connecting piece is rotatably connected to the second hinge shaft, and a second end of the second connecting piece is fixedly disposed in the foldable supporting frame.

6. The power strip with the foldable lamp according to claim 3, wherein the rotating disc comprises a second hinge protrusion at one end thereof, a second wiring hole and a second hinge component are respectively disposed at two sides of the second hinge protrusion, a first end of the second wiring hole is communicated into the outer housing, a second end of the second wiring hole is communicated into the foldable supporting frame, and the second wiring hole is configured to route wires of the light source module;

the second hinge component comprises a second hinge shaft, a second hinge damper, a second hinge fixing component, and a second connecting piece, a second hinge fixing groove is disposed at one end of the second hinge protrusion, and the second hinge damper is configured to fix a first end of the second hinge shaft in the second hinge fixing groove; and the second hinge fixing component is disposed at a second end of the second hinge shaft and is fixed in the foldable supporting frame, the second connecting piece is disposed between the second hinge damper and the second hinge fixing component, a first end of the second connecting piece is rotatably connected to the second hinge shaft, and a second end of the second connecting piece is fixedly disposed in the foldable supporting frame.

7. The power strip with the foldable lamp according to claim 6, wherein a protruding ring is disposed on an inner side of the rotating connection groove facing the lamp frame, limiting protrusions are respectively disposed at two sides of the protruding ring, protruding blocks are disposed on one surface of the rotating disc, each of the protruding blocks comprises an assembling step, each assembling step is configured to match with a corresponding one of the limiting protrusions; and the rotating disc is limited through respectively abutting the protruding blocks against the limiting protrusions during rotation.

8. The power strip with the foldable lamp according to claim 6, wherein the foldable supporting frame comprises a first supporting housing and a second supporting housing, the first supporting housing and the second supporting housing are mutually engaged to form an inner cavity, the inner cavity comprises a wiring groove, a connecting wire is disposed in the wiring groove, and a first power connection component and a second power connection component are respectively disposed at two ends of the connecting wire;

the first power connection component comprises a first fixing disc, a first hinge disc, a first conductive connection ring, and a first elastic contact piece, the inner cavity comprises a first fixing concave groove at one side opposite to the first wiring hole, the first conductive connection ring is disposed on the first fixing disc, the first elastic contact piece is disposed on the first hinge disc, a first end of the first elastic contact piece is electrically connected to the connecting wire, and a second end of the first elastic contact piece is electrically connected to the first conductive connection ring;

the first conductive connection ring comprises a first conductive inner ring and a first conductive outer ring, the first elastic contact piece comprises a first inner contact piece and a first outer contact piece, one end of the first inner contact piece is configured to contact the first conductive inner ring, one end of the first outer contact piece is configured to contact the first conductive outer ring;

the second power connection component comprises a second fixing disc, a second hinge disc, a second conductive connection ring, and a second elastic contact piece, the inner cavity further comprises a second fixing concave groove at one side opposite to the second wiring hole, the second hinge disc is disposed in the second fixing concave groove, the second fixing disc is disposed on the second wiring hole, the second conductive connection ring is disposed on the second fixing disc, the second elastic contact piece is disposed on the second hinge disc, a first end of the second elastic contact piece is electrically connected to the connecting wire, and a second end of the second elastic contact piece is electrically connected to the second conductive connection ring;

the second conductive connection ring comprises a second conductive inner ring and a second conductive outer ring, the second elastic contact piece comprises a second inner contact piece and a second outer contact piece, one end of the second inner contact piece is configured to contact the second conductive inner ring, one end of the second outer contact piece is configured to contact the second conductive outer ring;

the second conductive connection ring is configured to electrically connect to the light source module; and the connecting wire is a flexible printed circuit (FPC) connecting wire, one surface of the FPC connecting wire is attached to the wiring groove, a first contact pad and a second contact pin are respectively disposed at two ends of the FPC connecting wire, the first contact pin is configured to connect to the first elastic contact piece, and the second contact pin is configured to connect to the second elastic contact piece.

9. A power strip with a foldable lamp, comprising:

a power strip base;

a foldable arm; and a light source module;

wherein the power strip base comprises an outer housing, a plug-in module, and a power cord, the plug-in module is disposed in the outer housing, socket openings are disposed on the outer housing and are aligned with the plug-in module, the power cord is disposed at a first side of the outer housing and is configured to electrically connect to the plug-in module;

a connecting component is disposed at a second side of the outer housing, and the connecting component is configured to connect to the foldable arm;

the foldable arm comprises a foldable supporting frame and a rotating disc, a first end of the foldable supporting frame is hinged to the connecting component, and a second end of the foldable supporting frame is hinged to the rotating disc;

the light source module comprises a lamp frame and a light-emitting module, the light-emitting module is disposed on the lamp frame, a rotating connection groove is disposed at one side of the lamp frame, and the rotating disc is disposed on the rotating connection groove;

the power strip base comprises a bottom cover and an upper housing, the bottom cover is disposed at a bottom of the upper housing, and the upper housing comprises a first mounting portion, a second mounting portion, and a third mounting portion;

a light control board is disposed at the first mounting portion, a power supply control board is disposed at the second mounting portion, the socket openings and the plug-in module are disposed at the third mounting portion;

at least one light control button is disposed on an upper surface of the upper housing, one end of the at least one light control button is electrically connected to the light control board; and charging interfaces are disposed at one side of the power supply control board, one end of each of the charging interfaces extends to one side of the upper housing.

10. A power strip with a foldable lamp, comprising:

a power strip base;

a foldable arm; and a light source module;

wherein the power strip base comprises an outer housing, a plug-in module, and a power cord, the plug-in module is disposed in the outer housing, socket openings are disposed on the outer housing and are aligned with the plug-in module, the power cord is disposed at a first side of the outer housing and is configured to electrically connect to the plug-in module;

a connecting component is disposed at a second side of the outer housing, and the connecting component is configured to connect to the foldable arm;

the foldable arm comprises a foldable supporting frame and a rotating disc, a first end of the foldable supporting frame is hinged to the connecting component, and a second end of the foldable supporting frame is hinged to the rotating disc;

the light source module comprises a lamp frame and a light-emitting module, the light-emitting module is disposed on the lamp frame, a rotating connection groove is disposed at one side of the lamp frame, and the rotating disc is disposed on the rotating connection groove;

the power strip base comprises a lower housing and an upper housing, the upper housing and the lower housing are connected to each other, and an item placement groove is disposed on an upper surface of the upper housing;

a second mounting portion is disposed in the upper housing, a third mounting portion is disposed at one side of the lower housing close to the second mounting portion, a power supply control board is disposed at the second mounting portion, at least one light control button is disposed on the upper surface of the upper housing, one end of the at least one light control button is electrically connected to the power supply board, charging interfaces are disposed at one side of the power supply control board, one end of each of the charging interfaces extends to one side of the upper housing; and the socket openings are disposed at a side surface of the lower housing, and the plug-in module is disposed on the lower housing.

* * * * *